(12) United States Patent
Dani et al.

(10) Patent No.: US 10,965,709 B2
(45) Date of Patent: Mar. 30, 2021

(54) DOMAIN-SPECIFIC LANGUAGE SIMULANT FOR SIMULATING A THREAT-ACTOR AND ADVERSARIAL TACTICS, TECHNIQUES, AND PROCEDURES

(71) Applicant: Qualys, Inc., Foster City, CA (US)

(72) Inventors: Mayuresh Vishwas Dani, Fremont, CA (US); Ankur S. Tyagi, Foster City, CA (US)

(73) Assignee: Qualys, Inc., Foster City, CA (US)

( * ) Notice: Subject to any disclaimer, the term of this patent is extended or adjusted under 35 U.S.C. 154(b) by 31 days.

(21) Appl. No.: 16/384,321

(22) Filed: Apr. 15, 2019

(65) Prior Publication Data

US 2020/0329067 A1 Oct. 15, 2020

(51) Int. Cl.
*H04L 29/06* (2006.01)

(52) U.S. Cl.
CPC .......... *H04L 63/1433* (2013.01); *H04L 63/14* (2013.01); *H04L 63/1425* (2013.01); *H04L 63/1441* (2013.01)

(58) Field of Classification Search
CPC . H04L 63/14; H04L 63/1408; H04L 63/1416; H04L 63/1425; H04L 63/1433; H04L 63/1441; H04L 63/145; H04L 63/1458; H04L 63/1466; H04L 63/1475; H04L 63/1483; H04L 63/1491
See application file for complete search history.

(56) References Cited

U.S. PATENT DOCUMENTS

| | | | |
|---|---|---|---|
| 2009/0007270 A1* | 1/2009 | Futoransky | H04L 63/1433 726/25 |
| 2013/0312101 A1* | 11/2013 | Lotem | G06F 21/577 726/25 |
| 2017/0006055 A1* | 1/2017 | Strom | G06F 30/20 |
| 2017/0126712 A1* | 5/2017 | Crabtree | H04L 63/1425 |

OTHER PUBLICATIONS

Wikipedia, Tactics, Techniques and Procedures (TTP), https://en.wikipedia.org/wiki/Terrorist_Tactics,_Techniques,_and_Procedures, last updated Sep. 30, 2019.
Azeria, Tactics, Techniques and Procedures (TTP), https://azeria-labs.com/tactics-techniques-and-procedures-ttps/, 2017.

(Continued)

*Primary Examiner* — Edward Zee
(74) *Attorney, Agent, or Firm* — Baker & McKenzie LLP

(57) ABSTRACT

The present describes simulating a threat-actor executing an attack execution operation. According to one aspect of the subject matter described in this disclosure, a method for generating a domain-specific language (DSL) simulant is disclosed. The method may comprise determining, a framework based on an attack repository, determining a first primitive based on the framework, and determining a second primitive based on the framework. In one implementation, the first primitive and the second primitive are fundamental structures or constructs within a DSL. The method further comprises combining the first primitive and the second primitive into a DSL simulant. In one implementation, the DSL simulant is executed to simulate a threat-actor executing an attack execution operation.

20 Claims, 7 Drawing Sheets

(56) References Cited

OTHER PUBLICATIONS

The Mitre Corporation, ATT&CK Matrix, Defines commonly known adversarial behavior (TTPs), https://attack.mitre.org/, 2015.
The Mitre Corporation, PRE-ATT&CK Matrix: Subset of ATT&CK Matrix focusing on TTPs related to steps taken "before" launching an attack, https://attack.mitre.org/matrices/pre/, 2015.
The Mitre Corporation, ATT&CK Matrix for Enterprise: Subset of ATT&CK Matrix focusing on TTPs related to steps taken "during" an attack, primarily targeting enterprise users, https://attack.mitre.org/matrices/enterprise/, 2015.
The Mitre Corporation, ATT&CK Matrix Matrices for Mobile: Subset of ATT&CK Matrix focusing on TTPs related to steps taken "during" an attack, primarily focusing on mobile users, https://attack.mitre.org/matrices/mobile/, 2015.
Wikipedia, Cyber Kill Chain: Refers to sequence of tactics used by adversaries to achieve a goal. Multiple definitions from different sources but we are following ATT&CK Matrix as it is the most verbose, https://en.wikipedia.org/wiki/Kill_chain#The_Cyber_Kill_Chain, last updated on Sep. 30, 2019.
Wikipedia, The Unified Kill Chain: Refers to sequence of tactics used by adversaries to achieve a goal. Multiple definitions from different sources but we are following ATT&CK Matrix as it is the most verbose, https://en.wikipedia.org/wiki/Kill_chain#The_Unified_Kill_Chain, last updated on Sep. 30, 2019.

\* cited by examiner

400

DETERMINING A FRAMEWORK BASED ON AN ATTACK REPOSITORY, THE ATTACK REPOSITORY COMPRISING ATTACK DATA CAPTURED FROM MULTIPLE COMPUTING DEVICES ASSOCIATED WITH DIFFERENT ENTITIES
402

DETERMINING A FIRST PRIMITIVE BASED ON THE FRAMEWORK, THE FIRST PRIMITIVE COMPRISING: A FIRST IDENTIFIER DEFINING A FIRST ATTACK EXECUTION OPERATION, A FIRST DESCRIPTOR INDICATING AN ATTACK TYPE, A SECOND DESCRIPTOR INDICATING A VULNERABILITY TYPE, A THIRD DESCRIPTOR INDICATING A STABILITY PARAMETER, A FOURTH DESCRIPTOR INDICATING INTENSITY DATA
404

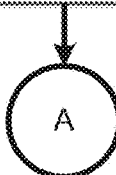

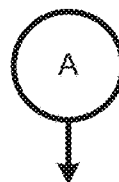

DETERMINING A SECOND PRIMITIVE BASED ON THE FRAMEWORK, THE SECOND PRIMITIVE INDICATING ENTICEMENT INFORMATION ASSOCIATED WITH THE ONE OR MORE RESOURCES, THE SECOND PRIMITIVE COMPRISING AT LEAST A FIRST ENTICING STEP CONFIGURED TO ENTICE A FIRST ATTACKER
606

COMBINING THE FIRST PRIMITIVE AND THE SECOND PRIMITIVE INTO A DOMAIN SPECIFIC LANGUAGE (DSL) FILE, THE DSL FILE BEING EXECUTED TO CREATE A COMPUTING ENVIRONMENT THAT ENTICES THE FIRST ATTACKER TO EXECUTE THE FIRST ATTACK EXECUTION OPERATION
608

FIG. 6

DOMAIN-SPECIFIC LANGUAGE SIMULANT FOR SIMULATING A THREAT-ACTOR AND ADVERSARIAL TACTICS, TECHNIQUES, AND PROCEDURES

TECHNICAL FIELD

The present disclosure relates to methods, systems, and apparatuses for simulating computer security conditions. More specifically, the present disclosure describes simulating a threat-actor executing an attack execution operation on a computing system.

BACKGROUND

In the computer security space, threat-actors (also called adversaries/attackers elsewhere herein) are constantly developing tactics, techniques, and practices/procedures that exploit security vulnerabilities of computing systems. As a result, the tech community is progressively moving towards collaborating and sharing information about threat-actor activity as part of dealing with computer security issues. For instance, the ATT&CK (Adversarial Tactics, Techniques, and Common Knowledge) framework (generally referred to as "attack classification and risk assessment framework"), which is a living growing document of threat tactics and techniques grouped into a repository of globally observed attacks on a plurality of networks and computing devices from millions of collaborating individuals and groups, provides invaluable insight into threat-actor activities on computing devices.

Information from sources like the attack classification and risk assessment framework can facilitate developing threat models in cybersecurity and/or computer security product and service community. Presently, there is no "formal language" that provides a schema for threat models and methodologies for enticing threat-actors and defending against attack execution operations threat-actors perform. More importantly, existing methodologies for threat-analysis and mitigation do not have a formal language based on information sources such as the attack classification and risk assessment framework.

Additionally, existing adversary emulation platforms and other computer security systems or computer security products are generally not configured to be domain-specific (i.e., configured for use within a specific domain). This makes it easy for threat-actors to compile and maliciously use custom scripts outside of a given domain for which the scripts were initially intended.

SUMMARY

According to one aspect of the subject matter described in this disclosure, a method for generating a DSL simulant for simulating threat-actor activities is disclosed. The method may comprise determining, using one or more computing device processors, a framework based on an attack repository. The attack repository may comprise attack data captured from multiple computing devices associated with different entities. In some implementations, the attack data comprises one or more of: a plurality of attack execution operations, one or more attackers associated with the plurality of attack execution operations, and one or more resources associated with the plurality of attack execution operations. The method may further comprise determining, using one or more computing device processors, a first primitive based on the framework. The first primitive may comprise: a first identifier defining a first attack execution operation comprised in the plurality of attack execution operations, a first descriptor indicating an attack type associated with the first attack execution operation, a second descriptor indicating a vulnerability type associated with the first attack execution operation, a third descriptor indicating a stability parameter associated with the first attack execution operation, and a fourth descriptor indicating intensity data associated with the first attack execution operation. The method further comprises determining, using one or more computing device processors, a second primitive based on the framework, the second primitive indicating one or more attack information associated with the first attack execution operation. In some implementations, the second primitive comprises at least a first attack step comprised in the one or more attack information. The first attack step may comprise: a second identifier defining the first attack step, an attack command associated with the first attack step, and one or more input resources that serve as input to the attack command. The one or more input resources may include at least one resource comprised in the one or more resources associated with the plurality of attack execution operation for executing the first attack step. The first attack step may also include a platform on which the first attack step is executed. Additionally, the method comprises combining, using one or more computing device processors, the first primitive and the second primitive into a domain specific language (DSL) simulant. In one implementation, the DSL simulant is executed to simulate attack operations executed by the first attacker to determine strategies for remediating against the first attack execution operation.

Other implementations of one or more of these aspects include corresponding systems, apparatus, and computer program products, configured to perform the actions of the methods, encoded on computer storage devices.

These and other implementations may each optionally include one or more of the following features: that the DSL simulant is useable to generate binaries executable within a specific domain, such that a security system outside the specific domain cannot execute the DSL simulant; that the attack type comprises one of a pre-attack type, a mobile attack type, and an enterprise attack type. The pre-attack type may indicate whether the first attack step is executed to: select a first target, obtain information about the first target, and execute the first attack execution operation on the first target. The mobile attack type may indicate whether the first attack step is executed as part of the first attack execution operation on a second target. In this case, the second target comprises a mobile computing environment. Further, the enterprise attack type may indicate whether the first attack step is executed as part of the first attack execution operation on a third target. The third target in this case comprises an enterprise computing environment. Moreover, the vulnerability type associated with the first attack execution operation may be one of: a public vulnerability indicating that the first attack execution operation is associated with a publicly known attack execution operation; a private vulnerability indicating that the first attack execution operation is associated with a private attack execution operation; and a custom vulnerability indicating that the first attack execution operation is associated with a custom attack execution operation. Additionally, the stability parameter associated with the first attack execution operation may comprise one of: a low stability parameter indicating that the DSL simulant is substantially unstable when executed; a medium stability parameter indicating that the DSL simulant is actively monitored when executed; and a high stability parameter indicating that the DSL simulant is substantially stable when executed. The intensity data associated with the first attack execution operation may comprise one of a low intensity data, a medium intensity data, and a high intensity data. The one or more input resources may comprise at least one or more of: an input file, an output file, a file path to the input file, and a file path to the output file. The platform is an operating system on which the first attack execution step is executed. Also, the framework, mentioned above, may be the attack classification and risk assessment framework.

The present disclosure is particularly advantageous as it allows simulating a plurality of security conditions in a controlled environment to provide insight into threat-actor activities. More specifically, the present disclosure facilitates simulating: a threat-actor executing an attack execution operation; defending against attack execution operations executed by a threat-actor; and enticing a threat-actor to execute an attack execution operation. These three scenarios are simulated using a simulant that is operable within a specific computer security environment (e.g., emulation platform) and has the benefit of not being replicated, reverse-engineered, or otherwise used by threat-actors outside the specific computer security environment for which the simulant was designed.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

FIG. 4 is an example flowchart for generating a first primitive of a DSL file, according to one implementation of this disclosure.

FIG. 6 is an example flowchart for generating a DSL file that creates a computing environment for enticing a first attacker to execute a first attack execution operation, according to one implementation of this disclosure.

DETAILED DESCRIPTION

Figure 1:
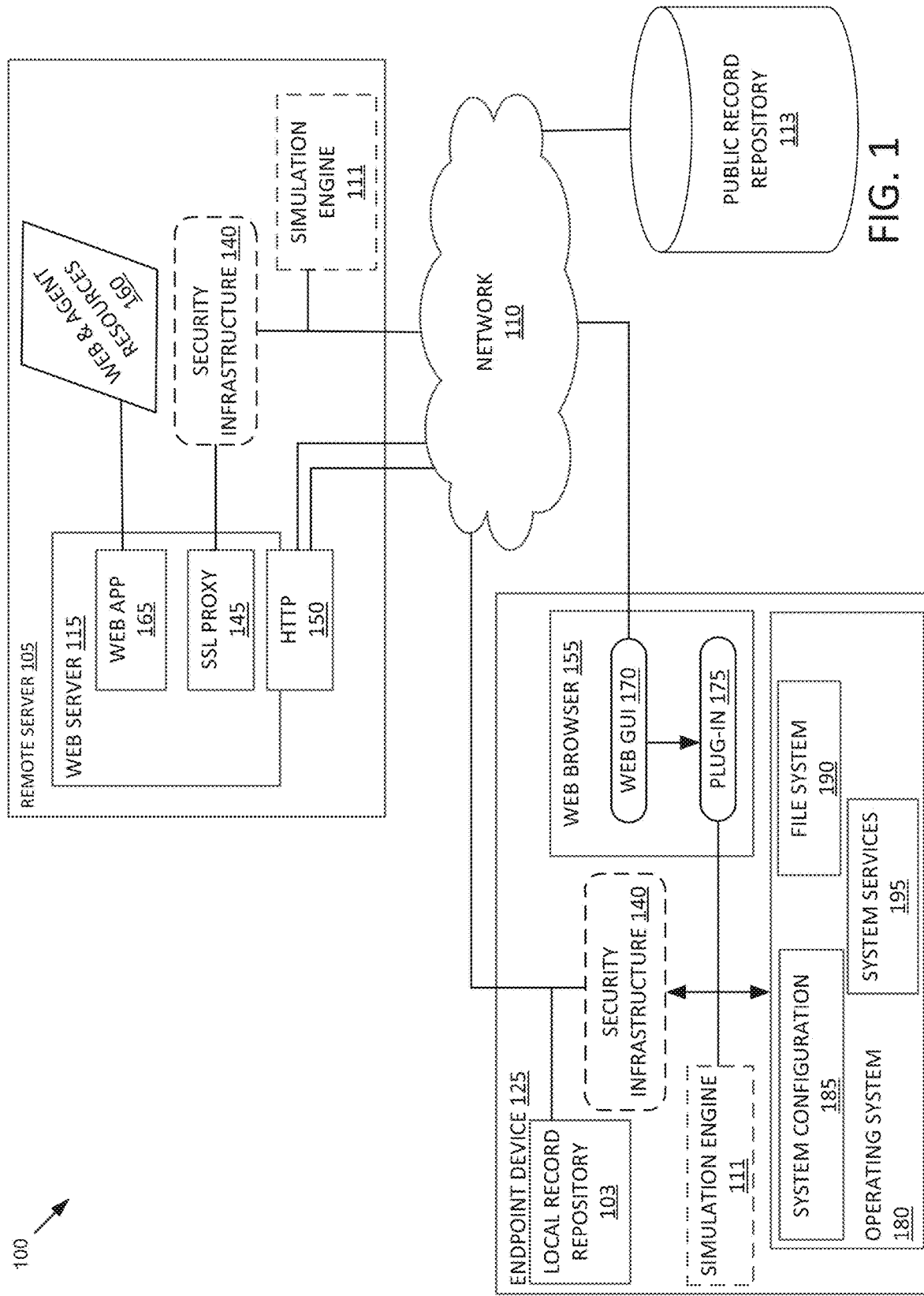
FIG. 1 is a high level diagram of an example system for generating a DSL file, according to one implementation of this disclosure.

The present disclosure describes various techniques and apparatuses for creating computer security conditions that provide insight into attacks or breaches into computing systems in order to take preventative security measures and/or remediate against such attacks. More specifically, one or more files are generated in a domain specific language (DSL) and executed by a computer security system within a said domain to, for example, simulate attack execution operations by a threat-actor, entice a threat-actor to execute one or more attack execution operations, and/or defend against attack execution operations. In one implementation, a domain may comprise a platform, a computer security system, a computer network, an entity, a group of computer systems, a group of entities, a geographical area associated with a group of computer systems and/or entities, a home network, a public network, an application running on a computing system and/or network, and/or a combination of the aforementioned domains. A language as used herein may comprise at least code, pseudocode, syntax, semantics, schema, constructs, definitions, etc. Thus, a DSL may comprise one or more of a code, pseudocode, syntax, semantics, schema, constructs, data structures and/or definitions that is operable within a specific domain, such that the code, pseudocode, syntax, semantics, schema, data structures, constructs and/or definitions are unusable outside the specific domain for which they were configured.

As used herein, a DSL file may comprise a data object, an electronic object, or a combination thereof that includes one or more primitives which may be a combination of code, pseudocode, syntax, semantics, schema, data structures, constructs, and/or definitions that are formed based on a given framework associated with an attack repository as further discussed below. In some embodiments, the DSL file includes resources associated with the primitives. These resources can include other files, file paths, routines, commands, and other software or hardware resource that is of interest to a threat-actor. In such cases, the DSL file can be used to lure a threat-actor into seeking one or more of the above-mentioned resources in order to more fully understand the threat-actor's implementation of attack execution operations during the pursuit of said resources. In other instances, and based on a framework associated with an attack repository, the DSL file includes tools that a threat-actor uses to execute one or more attack execution operations. Such implementations can use the DSL file to simulate one or more attack execution operations executed by a threat-actor for threat-analysis purposes. In other instances, the DSL file includes tools for protecting or defending against one or more attack execution operations. In such instances, the DSL file can be configured based on the framework associated with the attack repository to execute real-time defensive operations against attack execution operations by a threat-actor.

In the computer security space, threat-actors such as Advanced Persistent Threat (APT) groups generally execute attack execution operations for myriad reasons when attacking computing devices. Attack execution operations may include techniques, and/or tactics, and/or practices, and/or other modus operandi used by a threat-actor to execute an attack campaign. An attack campaign could comprise a collection of techniques and tactics used to execute an attack on a computing system. In one embodiment, tactics used to execute an attack campaign comprise a collection of techniques that are aligned to a particular phase within the attack campaign. Moreover, a technique used in an attack campaign could include an action that a threat-actor performs to achieve a specific goal. In some embodiments, one or more attack operations may be referred to as an attack execution operation and may similarly comprise a combination of techniques, and/or tactics, and/or practices used by a threat-actor in executing an attack campaign.

The reasons for executing an attack campaign may include seeking vulnerabilities on computing devices, holding computing devices hostage via denial of service attacks, seeking backdoor channels into computing devices to bypass normal authentication protocols, compromising computing devices using worms and keyloggers, eavesdropping, phishing to obtain data, and spoofing to obtain data. Because of this, individuals and organizations generally have some form of security infrastructure that deal with threats posed by threat-actor activities like attack campaigns.

However, existing security infrastructure often lack a unified platform that models threat-actor activities in a controlled environment, such as within a specific domain, in order to more fully understand and mitigate against threat-actor activities within said domain. Security infrastructures that execute some modeling on threat-actor activities are often vulnerable to threat-actor infiltration through reverse-engineering of models resulting from the modeling. In some cases threat-actors are also able to modify code associated with the modeling so as to render the generated threat models ineffective. Threat-actors usually execute such infiltrations using tools that exploit the "general purpose" nature of the codes generated for such modeling. Moreover, because most of these models are generated using attack execution operations that are "atomic" or discrete, it is often difficult to see relationships between discrete attack steps associated with the attack execution operation that are otherwise related and often show a progression of the attack steps comprised a given attack campaign. As a result existing computer security models often lack a holistic view of the attack steps of an attack campaign because of inaccurate threat models.

The techniques disclosed herein remedy the above noted deficiencies of the prior art solutions by designing and implementing DSL files that characterize threat-actor activities, and provide remedial and/or defensive operations against such activities. Additionally, the DSL files presented herein are configured to ensure that generated DSL files are unusable outside of the domains for which the DSL files were configured.

The techniques described herein generate DSL files based on an attack repository. The attack repository may include attack data captured from multiple computing devices associated with different entities (e.g., individuals, groups, organizations, etc.) and may be structured into a framework. For instance, the framework on which the attack repository may be based is the attack classification and risk assessment framework which allows attack execution operations to be classified into units that facilitate recognizing patterns associated with attack campaigns executed by threat-actors. Additionally, the attack repository may include data other than a plurality of attack execution operations. This data could be one or more attackers associated with the plurality of attack execution operations, one or more resources used by the one or more attackers to execute at least one attack execution operation, and one or more attack steps associated with the attack execution operation.

In some instances, DSL files are generated based on primitives. Primitives may include fundamental structures within a DSL. In some embodiments, one or more primitives may be combined to generate the DSL file. Primitives may include one or more identifiers, one or more descriptors, one or more defense steps, one or more enticing steps, one or more attack steps, one or more commands, one or more resources sought after by a threat-actor, one or more resources used by a threat-actor to execute attack campaigns, one or more tools used to defend against attack execution operations, one or more tools used to perform attack execution operations, etc.

System Environment

Illustrated in FIG. 1 is a high level diagram of an example system 100 for executing the principles disclosed herein. In the illustrated implementation, the system 100 may include a remote server 105 coupled to a network 110. The system 100 may also include an exemplary endpoint device 125 and a public record repository 113 communicatively coupled to each other and to the remote server 105 via the network 110. While a single remote server 105 is illustrated, the disclosed principles and techniques could be expanded to include multiple remote servers. Similarly, while a single endpoint device 125 and a single public record repository 113 are illustrated, the disclosed principles and techniques are expandable to multiple endpoint devices and multiple public record repositories.

In some embodiments, the remote server 105 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The remote server 105 may include a plurality of computing devices configured to communicate with one another and/or implement the techniques described herein.

In some instances, the remote server 105 may include various elements of a computing environment as described with reference to computing environment 200 of FIG. 2 and/or FIG. 3. For example, the remote server 105 may include processing unit 202, a memory unit 204, an input/output (I/O) unit 206, and/or a communication unit 208. The remote server 105 may further include subunits and/or other instances as described herein for performing operations associated with malware detection and remediation. A user (e.g., network administrator) may operate the remote server 105 either locally or remotely.

The remote server 105 may include a, web server 115, security infrastructure 140, simulation engine 111, and a web and agent resources 160. The web server 115, the security infrastructure 140, and the web and agent resources 160 may be coupled to each other and to the network 110 via one or more signal lines. The one or more signal lines may be a wired and/or wireless connection.

The web server 115 may include a secure socket layer (SSL) proxy 145 for establishing HTTP-based connectivity 150 between the remote server 105 and other devices coupled to the network 110. Other forms of secure connection techniques, such as encryption, may be employed on the web server 115 and across the network 110. Additionally, the web server 115 may deliver artifacts (e.g., binary code, instructions, etc.) to the security infrastructure 140 either directly via the SSL proxy 145 and/or via the network 110. Additionally, the web and agent resources 160 of the remote server 105 may be provided to the endpoint device 125 via the web app 165 on the web server 115. The web and agent resources 160 may be used to render a web-based graphical interface (GUI) 170 via the browser 155 running on the endpoint device 125.

The security infrastructure 140 may either be on the remote server 105 and/or the endpoint device 125. Security infrastructure 140 may include one or more computer security products such as access control software, anti-keyloggers, anti-malware, anti-spyware, anti-subversion software, anti-tamper software, antivirus software, cryptographic software, computer-aided dispatch (CAD), Firewall (web or otherwise), Intrusion detection systems (IDS), Intrusion prevention systems (IPS), log management software, records management software, Sandboxes (e.g., a secure environment in which various computing processes may be executed), security information management, security information and event management (SIEM) software, anti-theft software, parental control software, cloud-based security protection, and/or the like.

In some embodiments, security infrastructure 140 can determine whether scan data is indicative of malware and whether a report indicating that the endpoint device 125 is exposed to risks associated with malware. The report may include a listing of identified attributes, a count of identified attributes, a type of each identified attribute, an identification of each malware family and/or malware variant determined to be associated with the endpoint device 125, and/or one or more recommendations for addressing the vulnerabilities. This record may be stored on the local record repository 103 and/or the public record repository 113.

The security infrastructure 140 may be configured to execute security operations including preparedness operations such as processes for dealing with security incidents/breaches/compromises; detection and analysis operations such as identifying and investigating suspicious activity associated with security events; containment, eradication, and recovery operations including determining the nature of a security event (e.g., detections, etc.); and post incident activity including preventative measures that prevent previous security breaches from subsequently reoccurring.

In some embodiments, the security infrastructure 140 may access an operating system 180 of the endpoint device 125 in order to execute security operations as discussed elsewhere herein. For instance, the security infrastructure 140 may gain access into the operating system in order to scan a security posture (e.g., perform malware detection) of the endpoint device 125 by scanning a system configuration 185, a file system 190, and/or system services 195 of the endpoint device 125. The plug-in 175 of the web browser 155 may provide needed downloads that facilitate operations executed by the operating system 180, the security infrastructure 140, and/or other applications running on the endpoint device 125.

The network 110 may include a plurality of networks. For instance, the network 110 may include any wired/wireless communication network that facilitates communication between the remote server 105, the public record repository 113, and the endpoint device 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

Returning to FIG. 1, the public record repository 113 may be one or more storage devices that store data, information, and instructions used by the remote server 105 and the endpoint device 125. The stored information may include information about users, information about threat-actors, information about techniques, tactics and practices used by threat-actors to execute an attack campaign, suggestions for remediation against an attack campaign, and other security information from multiple computing devices. In one embodiment, the security information is captured from computing devices of multiple different organizations and stored in the public record repository 113. In other embodiments, the information stored in the public record repository 113 may be structured into a framework based on real-world observations of attacks on computing devices across the globe. In some instances, the framework can provide comprehensive methods that look into tools/resources/components/applications used by threat-actors to execute an attack campaign. Additionally, the framework could also enable mapping security events detected on computing devices to a combination of techniques, tactics, and practices within the public record repository 113. This can be used to determine the techniques, tactics, and practices used by threat-actors to hide their attacks, stage their exploits, evade detection, leverage network weaknesses, etc. As previously noted, this framework, in some instances, is the attack classification and risk assessment framework where attacks are classified into discreet units to facilitate recognizing patterns associated with attack campaigns. In some implementations, the public record repository 113 and/or the local record repository 103 are simply referred to as an attack repository.

The one or more storage devices mentioned above in association with the public record repository 113 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

While the public record repository 113 is shown as coupled to the remote server 105 and to the endpoint device 125 via the network 110, the data in the public record repository 113 may be replicated, in some embodiments, on the remote server 105 and/or the endpoint device 125. That is to say that a local copy of the data in the public record repository 113 may be stored on the remote server 105 and/or the endpoint device 125. This local copy may be synced with the public record repository 113 so that when there are any changes to the information in the public record repository 113, the local copy is also accordingly updated in real-time or pseudo-real-time to be consistent with the information in the public record repository 113.

Turning back to FIG. 1, the endpoint device 125 may include a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server, a virtual server, a virtual machine, and/or a video communication server. In some embodiments, the endpoint device 125 may include a plurality of computing devices configured to communicate with one another and/or implement the techniques described herein.

The local record repository 103, shown in association with the endpoint device 125, may be one or more storage devices that store data, information, and instructions used by the endpoint device 125 and/or other devices coupled to the network 110. The stored information may include various logs/records associated with captured security data/security events by the security infrastructure 140. For example, the various reports, logs, data, etc., generated by the one or more security products of the security infrastructure 140 may be stored in the local record repository.

The one or more storage devices discussed above in association with the local record repository 103 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

Figure 2:
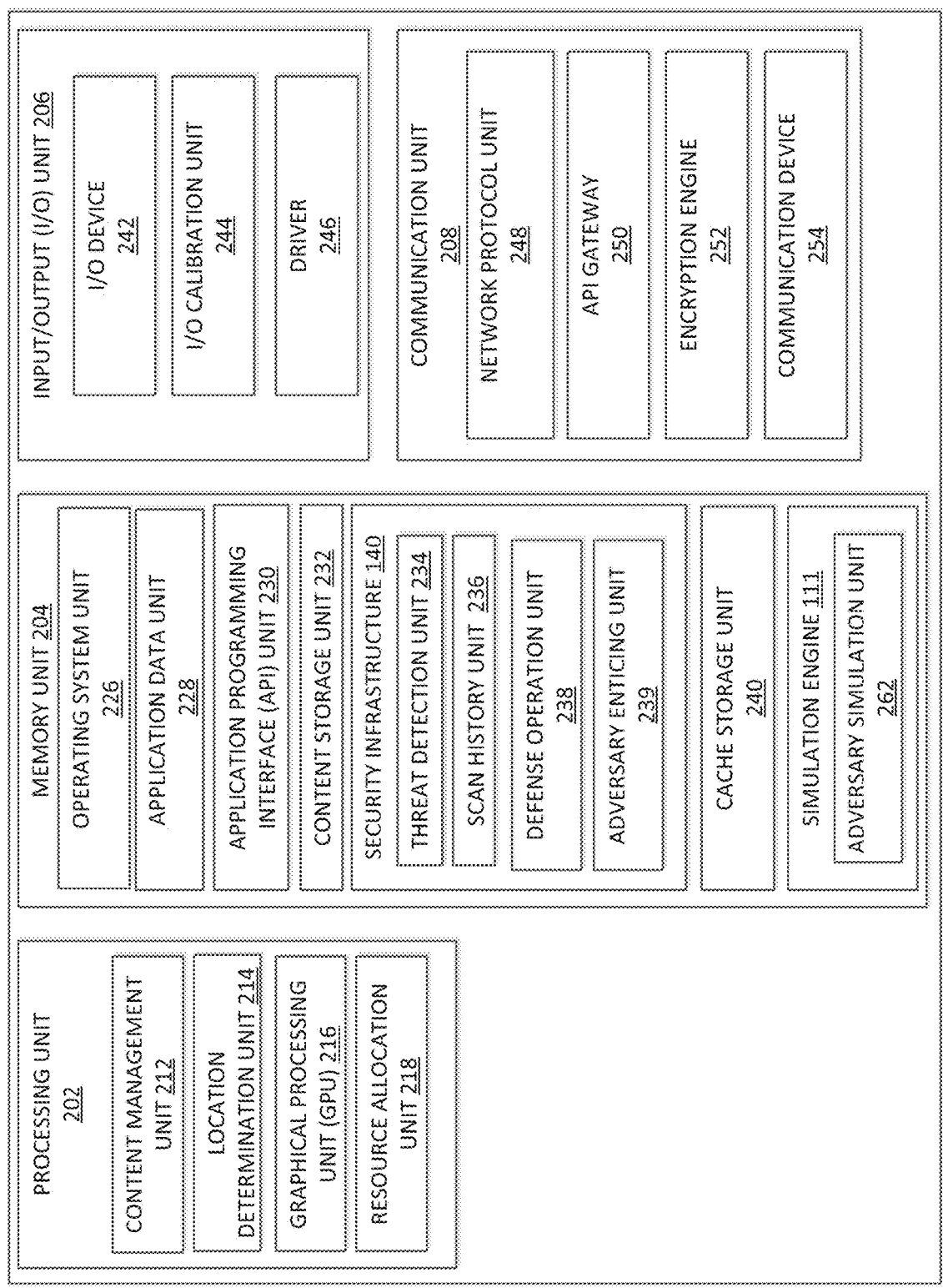
FIG. 2 is a functional block diagram of the computing environment within which a DSL file can be generated and executed, according to one implementation of this disclosure.
Figure 3:
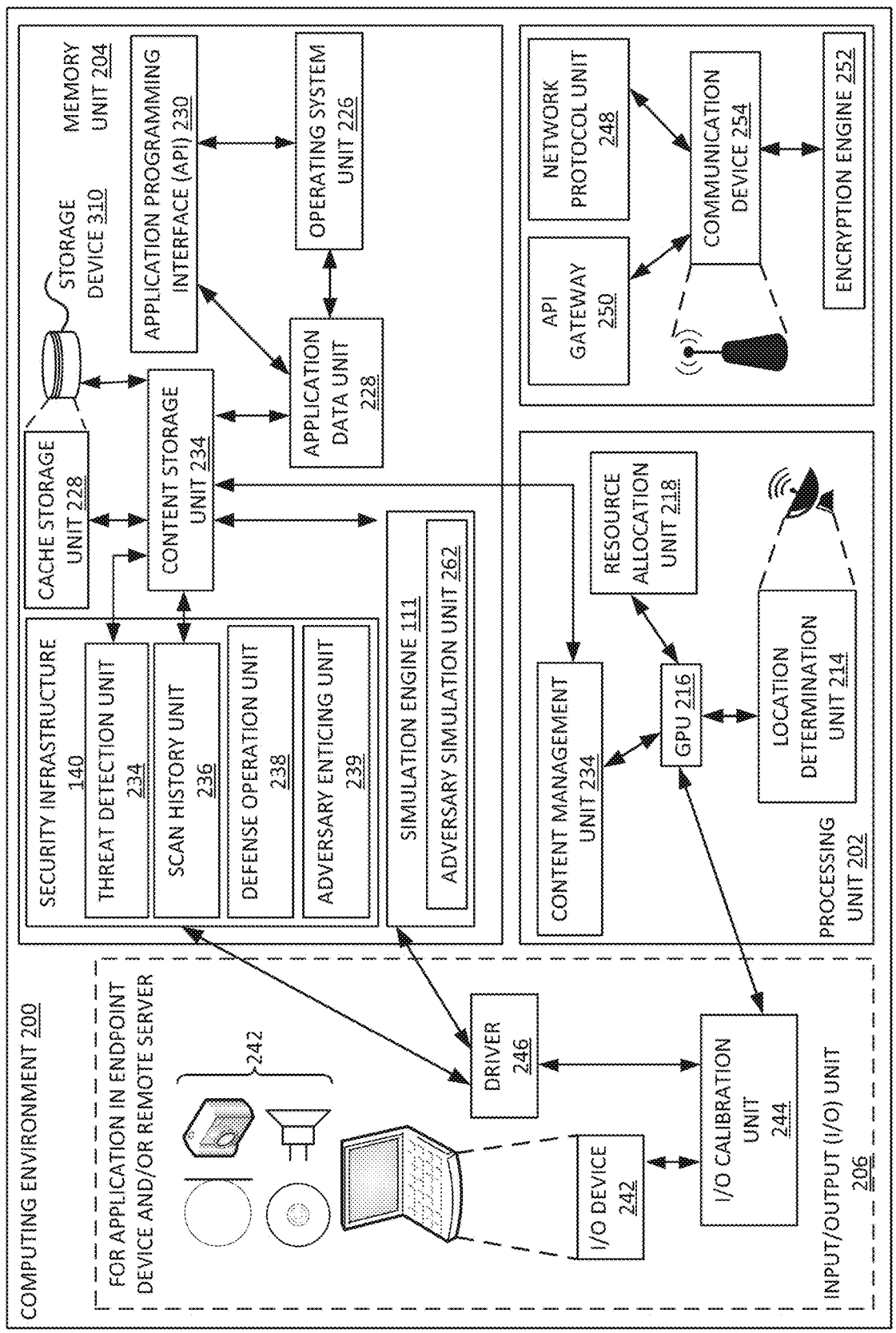
FIG. 3 is a detailed system diagram of the computing environment of FIG. 2, according to one implementation of this disclosure.

The other elements of the endpoint device 125 are discussed in association with the computing environment 200 of FIG. 2 and/or FIG. 3. For example, elements such as a processing unit 202, a memory unit 204, an input/output (I/O) unit 206, and/or a communication unit 208 may execute one or more of the modules of endpoint device 125 and/or one or more elements of the remote server 105 shown in FIG. 1. The endpoint device 125 may also include subunits and/or other computing instances as described herein for performing operations associated with malware detection, malware remediation, and/or malware simulation.

FIG. 2 and FIG. 3 illustrate exemplary functional and system diagrams of a computing environment 200 for performing the operations described herein. Specifically, FIG. 2 provides a functional block diagram of the computing environment 200, whereas FIG. 3 provides a detailed system diagram of the computing environment 200.

As seen in FIG. 2 and FIG. 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described herein. Additionally, each unit and/or subunit may be operatively and/or otherwise communicatively coupled with each other so as to facilitate the operations described herein. The computing environment 200 including any of its units and/or subunits may include general hardware, specifically-purposed hardware, and/or a combination thereof.

Importantly, the computing environment 200 and any units and/or subunits of FIG. 2 and/or FIG. 3 may be included in one or more elements of system 100 as described with reference to FIG. 1. For example, one or more elements (e.g., units and/or subunits) of the computing environment 200 may be included in the remote server 105 and/or the endpoint device 125.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in a similar fashion in any of the other units and/or devices included in the system 100 of FIG. 1. Additionally, any actions described herein as being performed by a processor or one or more processors of a computing device (or one or more computing device processors/one or more computing system processors), may be taken by the processing unit 202 of FIG. 2 and/or FIG. 3 alone and/or by the processing unit 202 in conjunction with one or more additional processors, units, subunits, elements, components, devices, and/or the like. Further, while one processing unit 202 may be shown in FIG. 2 and/or FIG. 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, malware content, or any combination thereof. In some instances, Content on which the content management unit 212 may operate includes device information, user interface data, images, text, themes, audio files, video files, documents, and/or the like. Additionally, the content management unit 212 may control the audio-visual environment and/or appearance of application data during execution of various processes (e.g., via web GUI 170 at the endpoint device 125). In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data (e.g., scanning instructions, scan data, and/or the like) described herein. In some embodiments, the GPU 216 may be utilized to render content for presentation on a computing device (e.g., via web GUI 170 at the endpoint device 125). The GPU 216 may also include multiple GPUs and therefore may be configured to perform and/or execute multiple processes in parallel. In some implementations, the GPU 216 may be used in conjunction with the threat detection unit 234, the scan history unit 236, and/or other subunits associated with the memory unit 204, the I/O unit 206, the communication unit 208, and/or a combination thereof.

The resource allocation unit 218 may facilitate the determination, monitoring, analysis, and/or allocation of computing resources throughout the computing environment 200 and/or other computing environments. For example, the computing environment may facilitate a high volume of data (e.g., files, malware, malware variants, etc.), to be processed and analyzed. As such, computing resources of the computing environment 200 utilized by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may utilize computing resources of a second computing environment separate and distinct from the computing environment 200 to facilitate a desired operation.

For example, the resource allocation unit 218 may determine a number of simultaneous computing processes and/or requests. The resource allocation unit 218 may also determine that the number of simultaneous computing processes and/or requests meets and/or exceeds a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

In some embodiments, factors affecting the allocation of computing resources by the resource allocation unit 218 may include the number of computing processes and/or requests, a duration of time during which computing resources are required by one or more elements of the computing environment 200, and/or the like. In some implementations, computing resources may be allocated to and/or distributed amongst a plurality of second computing environments included in the computing environment 200 based on one or more factors mentioned above. In some embodiments, the allocation of computing resources of the resource allocation unit 218 may include the resource allocation unit 218 flipping a switch, adjusting processing power, adjusting memory size, partitioning a memory element, transmitting data, controlling one or more input and/or output devices, modifying various communication protocols, and/or the like. In some embodiments, the resource allocation unit 218 may facilitate utilization of parallel processing techniques such as dedicating a plurality of GPUs included in the processing unit 202 for running a multitude of processes.

The memory unit 204 may be utilized for storing, recalling, receiving, transmitting, and/or accessing various files and/or data (e.g., malware files, malware samples, scan data, and/or the like) during operation of computing environment 200. For example, memory unit 204 may be utilized for storing, recalling, and/or updating scan history information as well as other data associated with, resulting from, and/or generated by any unit, or combination of units and/or subunits of the computing device 200. In some embodiments, the memory unit 204 may store instructions and/or data that may be executed by the processing unit 201. For instance, the memory unit 204 may store instructions that execute operations associated with one or more units and/or one or more subunits of the computing environment 200. For example, the memory unit 204 may store instructions for the processing unit 202, the I/O unit 206, the communication unit 208, and itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored may be a command, a current operating state of computing environment 200, an intended operating state of computing environment 200, and/or the like. As a further example, data stored in the memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage. Secondary storage may be comprised of one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases (e.g., the public record repository 113 discussed with reference to FIG. 1) located remotely from computing environment 200 may be utilized and/or accessed by memory unit 204. In some embodiments, memory unit 204 and/or its subunits may be local to the remote server 105 and/or the endpoint device 125 and/or remotely located in relation to the remote server 105 and/or the endpoint device 125.

Turning back to FIG. 2, the memory unit 204 may include subunits such as an operating system unit 226, an application data unit 228, an application programming interface 230, a content storage unit 232, security infrastructure 140, a cache storage unit 240, and a simulation engine 111. Each of the aforementioned subunits of the memory unit 204 may be communicatively and/or otherwise operably coupled with each other and other units and/or subunits of the computing environment 200.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application utilized by computing environment 200 and/or any other computing environment described herein. For example, the endpoint device 125 may be required to download, install, access, and/or otherwise utilize a software application (e.g., web application 165) to facilitate performance of malware scanning operations, attack kill chain (i.e., a sequence of attack steps associated with an attack campaign) generation, and/or asset remediation trend map (a sequence of remediation steps for remediating against an attack campaign) generation. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein to, user permissions, security credentials, and/or the like.

The application programming interface (API) unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the remote server 105 and the endpoint device 125 to communicate with each other.

The content storage unit 232 may facilitate deployment, storage, access, and/or utilization of information associated with performance of malware scanning operations and/or framework processes by computing environment 200 and/or any other computing environment described herein. In some embodiments, content storage unit 232 may communicate with content management unit 212 to receive and/or transmit content files (e.g., media content).

Further to the discussion regarding security infrastructure 140 above, security infrastructure 140 may include at least a threat detection unit 234, a scan history unit 236, a defense operation unit 238, and an adversary enticing unit 239. The threat detection unit 234 may store instructions associated with one or more security products/systems of security infrastructure 140 to facilitate the detection of threats posed by threat-actors. For example, the threat detection unit may store instructions associated with access control software, anti-keyloggers, anti-malware, anti-spyware, anti-subversion software, anti-tamper software, antivirus software, cryptographic software, computer-aided dispatch (CAD), Firewall (web or otherwise), IDS, IPS, log management software, records management software, Sandboxes, security information management, SIEM software, anti-theft software, parental control software, cloud-based security protection, and/or the like.

The defense operation unit 238 may be executable to generate a DSL file that is executed to defend against attack execution operations of a threat-actor. In some embodiments, the defense operation unit 238 can receive and execute a DSL file configured for executing defense operations against one or more attack execution operations. For example, given security infrastructure 140 within a first domain associated with computing environment 200, a DSL file for defending against attack execution operations of a threat-actor may be generated based on the attack classification and risk assessment framework for the first domain by a second computing environment separate from the computing environment 200. The generated DSL file may then be subsequently executed by the defense operation unit 238 within the computing environment 200. The defense operation unit 238 is further discussed with reference to FIG. 7.

Similarly, the adversary enticing unit 239 may be executable to generate a DSL file that is implemented to entice or lure a threat-actor to execute one or more attack execution operations. In some embodiments, the adversary enticing unit 239 unit receives and executes a DSL file configured for implementing enticement operations that lure a threat-actor unsuspectingly. For example, given security infrastructure 140 within a first domain associated with computing environment 200, a DSL file for enticing a threat-actor may be generated based on the attack classification and risk assessment framework for the first domain by a second computing environment separate from the computing environment 200. The generated DSL file may then be subsequently executed by the adversary enticing unit 239 within the computing environment 200. The adversary enticing unit is further discussed in association with FIG. 6.

The scan history unit 236 may facilitate deployment, storage, access, analysis, and/or utilization of scan data received during a scan of the endpoint device 125. For example, scan history unit 236 may store information associated with each operation that involves file scanning, malware file execution, malware detection, and or the other operations executed by security products of security infrastructure 140. Information stored in scan history unit 236 may be utilized by the content management unit 212, GPU 216, threat detection unit 222, and/or other units and/or subunits of computing environment 200. It should be understood that information generated by or associated with the threat detection unit 234 and/or scan history unit 236 may be stored in the local record repository 103 and/or the public record repository.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The simulation engine 111 shown in FIG. 2 may simulate one or more computer security conditions associated with a threat-actor in a controlled environment (e.g., within a given domain). For example, the simulation engine 111 may simulate threat-actor activities such as attack execution operations. In other embodiments, the simulation engine 111 may simulate computing conditions that make it conducive for a threat-actor to launch an attack campaign. In other embodiments, the simulations engine 111 may simulate computing condition that make it difficult for a threat-actor to execute an attack campaign.

In one implementation, the simulation engine 111 includes an adversary simulation unit 262. The adversary simulation unit 262 may be executable to generate a DSL file that simulates attack operations executed by a threat-actor. In some embodiments, the adversary simulation unit 262 unit receives and executes a DSL file configured for implementing attack execution operations performed by a threat-actor. For example, given simulation engine 111 within a first domain associated with computing environment 200, a DSL file for simulating a threat-actor or a threat-actor executing one or more attack execution operations may be generated based on a framework such as the attack classification and risk assessment framework associated with the first domain. In such cases, the DSL file can be generated by a second computing environment separate from the computing environment 200. The generated DSL file may then be subsequently executed by the adversary simulation unit 262 within the computing environment 200. The adversary simulation unit 262 is further discussed in association with FIG. 5.

The I/O unit 206 may include hardware and/or software elements for the computing environment 200 to receive, and/or transmit, and/or present information useful for performing malware scanning operations and/or other processes as described herein. For example, elements of the I/O unit 206 may be used to receive input from a user of the endpoint device 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with malware scanning, detection, displaying visual representations of attack steps used in attack campaigns associated with the malware scanning and detections, displaying visual representations of remediation strategies against an attack campaign, and other operations described herein.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may utilize a driver 246 (or multiple drivers) to calibrate I/O device 242. For example, driver 246 may include software that is to be installed by I/O calibration unit 244 so that an element of computing environment 200 (or an element of another computing environment) may recognize and/or integrate with I/O device 242 for the malware scanning operations and/or framework processes described herein.

The communication unit 208 may facilitate establishment, maintenance, monitoring, and/or termination of communications between computing environment 200 and other computing environments, third party server systems, and/or the like (e.g., between the remote server 105 and the endpoint device 125). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, network protocol unit 248 may detect and/or define a communication protocol required by a particular network and/or network type. Communication protocols utilized by network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing malware scanning operations and/or other processes described herein.

The application programming interface (API) gateway 250 may facilitate other devices and/or computing environments to access API unit 230 of memory unit 204 of computing environment 200. For example, an endpoint device 125 may access API unit 230 of computing environment 200 via API gateway 250. In some embodiments, API gateway 250 may be required to validate user credentials associated with a user of an endpoint device prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

DSL File Generation

As previously noted, the system 100 may be configured to for example, execute a DSL file to: create a computing environment that entices a threat-actor to perform attack execution operations; create a computing environment for defending against attack execution operations of a threat-actor; and to simulate at least an attacker executing one or more attack execution operations. The execution of a DSL to accomplish at least the aforementioned ends can provide invaluable insight into developing security systems, security protocols, security products, etc. for a given domain that are less vulnerable, and extremely robust to infiltrations by threat-actors. To accomplish this, the present disclosure presents techniques that rely on one or more constructs/schemas/structures defined and utilized within a given or specific domain. For the purposes of the forgoing discussion, the one or more constructs/schemas/structures would be referred to as a primitive as discussed above. In one implementation, one or more primitives form the "building blocks" used to characterize the scenarios for which DSL files are generated and/or implemented as mentioned at the beginning of this paragraph. Because the one or more primitives can be used within a specific domain, we refer, in one embodiment, to a combination of primitives as a DSL file. That is to say that the DSL file can be configured for a specific domain and executed within the specific domain. This advantageously makes it hard, and sometimes, impossible for threat-actors to replicate, imitate, or otherwise reuse DSL files or insights derived from executing a DSL file to breach security systems associated with the DSL file unless they have access to the domain associated with the DSL file. Access to a given domain may comprise having licenses to specific security products associated with said domain, having credential access to the said domain or credential access to products/systems within said domain, having subscriptions to said domain or subscriptions to products/systems within said domain, having licenses to said domain or licenses to products/systems within said domain, etc.

It is further appreciated that the one or more primitives comprised in a DSL file are based on a framework. The framework may comprise a classification of attack execution operations into units that allow organizing, structuring, pattern recognition, attack kill chain determination, asset remediation trend map determination, etc., associated with one or more attack execution operations. Turning to FIG. 4 for example, a first primitive may be generated based on the flowchart 400 of FIG. 4. Specifically, the security infrastructure 140 and/or simulation engine 111 may be executed by one or more computing device processors to implement the various blocks of FIG. 4. At block 402, the security infrastructure 140 and/or simulation engine 111 may determine a framework based on an attack repository. The attack repository may comprise attack data captured from multiple computing devices associated with different entities. For example, the attack data may comprise one or more of: a plurality of attack execution operations, one or more attackers/threat-actors associated with the plurality of attack execution operations, and information associated with one or more resources associated with the plurality of attack execution operations.

In the case of executing a DSL file for enticing an adversary, the one or more resources may include data, information, computing resources such as applications, and hardware resources such as memory sought after by one or more threat-actors during executing at least an attack execution operation comprised in the plurality of attack execution operations. In such cases, the DSL files including such resources may be configured to not only lure a threat-actor to execute one or more attack execution operations but also include "bogus resources" or resources deliberately imbedded into one or more primitives such that when such resources are accessed by the threat-actor, the threat-actor does not harm or otherwise compromise the given domain associated with the DSL file. It is appreciated that actively monitoring and understanding a threat-actor seeking such bogus resources within a given domain while executing one or more attack execution operations insulates said domain's actual valuable resources from being compromised.

In the embodiment for executing a DSL file that simulates a threat-actor executing an attack execution operation, the one or more resources associated with the attack repository could include input files, output files, input file paths, output file paths, hardware tools, and/or software tools associated with the attack execution operation. In some embodiments, resources such as malware, spyware, keyloggers, viruses, subversion software, tamper software, and other tools other than those explicitly mentioned above are comprised in the one or more resources associated with plurality of attack execution operations. For instance, malware, spyware, keyloggers, viruses, subversion software, and/or tamper software, can be modeled into a primitive associated with a DSL file for simulating attack execution operations by a threat-actor.

Similarly, in the case of executing a DSL file for defending against attack execution operations by a threat-actor, the one or more resources associated with the attack repository could include input files, file paths, hardware tools, and/or software tools associated with the attack execution operation. In one embodiment, resources such as access control software, anti-keyloggers, anti-malware, anti-spyware, anti-subversion software, anti-tamper software, antivirus software, cryptographic software, Firewall (web or otherwise), IDS, IPS, log management software, records management software, Sandboxes, security information management, STEM software, anti-theft software, parental control software, cloud-based security protection, or the like, may be comprised in the one or more resources associated with a primitive, and/or associated with the plurality of attack execution operations. For instance, access control software, anti-keyloggers, anti-malware, anti-spyware, anti-subversion software, anti-tamper software, antivirus software, cryptographic software, Firewall (web or otherwise), IDS, IPS, log management software, records management software, Sandboxes, security information management, SIEM software, anti-theft software, parental control software, cloud-based security protection, filesystem, event viewer, a system monitor, or the like, may be modeled into the second primitive of flowchart 700 (e.g., via the parameter) and/or the second primitive of flowchart 500. In embodiments with the parameter associated with the second primitive of flowchart 700, the one or more resources may be modeled into the DSL file and executed based on at least a file type, a file path, and a security event. The security event in such instances may comprise commands that detect one or more attack steps associated with the first attack execution operation.

At block 404, the security infrastructure 140 and/or simulation engine 111 may be executed by the one or more computing device processors to determine a first primitive based on the framework. The first primitive may comprise: a first identifier defining a first attack execution operation comprised in the plurality of attack execution operations; a first descriptor indicating an attack type associated with the first attack execution operation; a second descriptor indicating a vulnerability type associated with the first attack execution operation; a third descriptor indicating a stability parameter associated with the first attack execution operation; and a fourth descriptor indicating intensity data associated with the first attack execution operation.

In some implementations, the first identifier may comprise a number and/or a name associated with the first attack execution operation. This number and/or name may facilitate, in some embodiments, identifying the first attack execution operation within the attack repository. Additionally, the attack type mentioned in association with the first descriptor may comprise one of a pre-attack type, a mobile attack type, and an enterprise attack type. In particular, the pre-attack type indicates whether a first attack step associated with the first attack execution operation is executed to: select a first target; obtain information about the first target; and execute the first attack execution operation on the first target. The mobile attack type indicates whether the first attack step is executed as part of the first attack execution operation on a second target. The second target may comprise a mobile computing environment. The enterprise attack type indicates whether the first attack step is executed as part of the first attack execution operation on a third target, the third target comprising an enterprise computing environment.

Furthermore, the vulnerability type associated with the second descriptor may comprise one of a public vulnerability, a private vulnerability, and a custom vulnerability. A public vulnerability may indicate that the first attack execution operation is associated with a publicly known attack execution operation. A private vulnerability may indicate that the first attack execution operation is associated with a private attack execution operation while a custom vulnerability may indicate that the first attack execution operation is associated with a custom attack execution operation.

The stability parameter associated with the third descriptor of the first primitive of flowchart 400 may comprise parameters of stability that ascribe a level of stability to a DSL file. For instance, these parameters may include a low stability parameter that indicates that the DSL file is substantially unstable when executed by the one or more computing device processors. Another parameter included in the parameters of stability may be a medium stability parameter that indicates that the DSL file is actively monitored when executed. In some other embodiments, a high stability parameter may be included in the parameter of stability that indicates that the DSL file is substantially stable when executed. It is noted that other parameters of stability other than the low, medium, and high parameters of stability may exist in other embodiments and may indicate other levels of stability of the DSL file other than those described herein.

The intensity data associated with the first attack execution operation may reflect the extent to which the first attack execution operation can be monitored, tracked, deciphered, detected, and/or otherwise understood. In other words intensity data may indicate the complexity associated with how the first attack execution operation of flowchart 400 is executed. In some implementations, the intensity data may comprise one of low intensity data, medium intensity data, and high intensity data. For example, low intensity data may indicate that the first attack execution operation is executed with attack steps having a substantially low level of complexity. Medium intensity data may indicate that the first attack execution operation is executed with attack steps having a level of complexity indicative of the attack steps being obfuscated to make understanding and reverse engineering of the attack steps substantially difficult to execute. High intensity data may indicate that the first attack execution operation is executed with attack steps having a level of complexity indicative of attack steps being obfuscated and evasion-enabled to bypass at least an information security device.

Simulating a Threat-Actor

Figure 5:
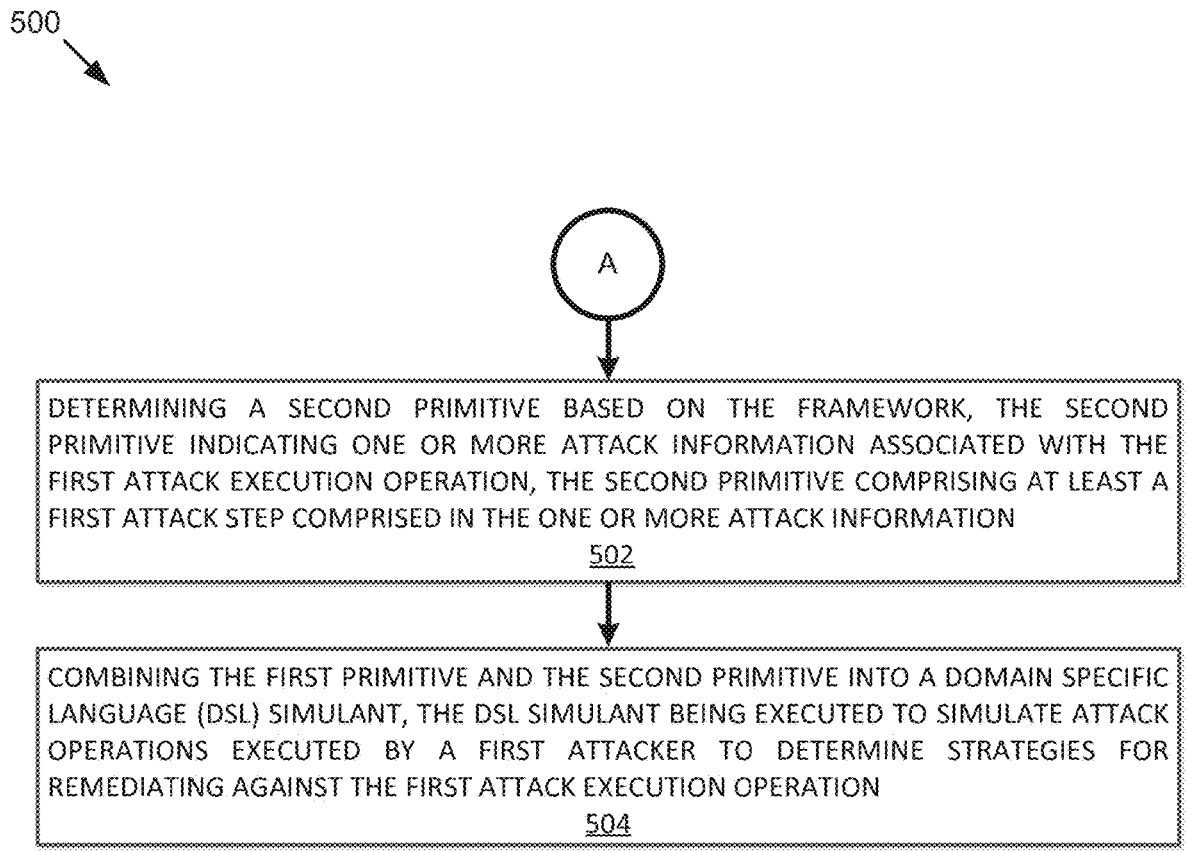
FIG. 5 is an example flowchart for generating a DSL file that simulates attack operations executed by a first attacker, according to one implementation of this disclosure.

FIG. 5 shows a flowchart 500 for generating a DSL file that simulates attack operations executed by a threat-actor. In one embodiment, a DSL file that simulates attack operations may be referred to as a DSL simulant. At block 502, the adversary simulation unit 262 may be executed by the one or more computing device processors to determine a second primitive based on the framework of flowchart 400. In one implementation, the second primitive indicates one or more attack information associated with the first attack execution operation. The second primitive may comprise at least a first attack step comprised in the one or more attack information. The first attack step may include: a second identifier defining the first attack step; an attack command associated with the first attack step; one or more input resources serving as input to the attack command; and a platform on which the first attack step is executed.

In some implementations, the one or more input resources include at least one resource comprised in the one or more resources used by the one or more attackers to execute the first attack step discussed in association with flowchart 400. For instance, the one or more input resources may include at least one or more of an input file, an output file, a file path to the input file, a file path to the output file, malware, spyware, keyloggers, viruses, subversion software, and/or tamper software. In one embodiment, the platform discussed in association with the flowchart 500 is an operating system on which the first attack execution step is executed. In one implementation, the operating system is a Windows operating system. In another embodiment, the operating system is a Macintosh operating system. In further embodiments, the operating system is a Linux operating system.

At block 504 of FIG. 5, the adversary simulation unit 262 may be executed by one or more computing device processors to combine the first primitive from the flowchart of FIG. 4 and the second primitive from the flowchart of FIG. 5 into a DSL simulant. The DSL simulant in this case may be executable to simulate attack operations executed by the first attacker. In one implementation, the generated DSL simulant may be "ingested" or otherwise executed by, for example, simulation engine 111 in order to simulate one or more attack operations based on the framework associated with the attack repository. For instance, the framework associated with the attack repository could include a plurality of attack campaigns executed by a plurality of threat-actors. The generated DSL simulant could be configured to be a permutation of one or more attack campaigns comprised in the plurality of attack campaigns. When such a DSL simulant is executed by one or more computing device processors using for example, simulation engine 111 (e.g., Qualys Breach and Attack Simulation system), insight could be gained into: how threat-actors may evolve their attack campaigns; what possible vulnerabilities threat-actors would likely exploit given a security posture; how effective a given security posture is; etc. Because such simulations are done in a controlled computing environment, these insights are gained without necessarily compromising any computing resource or asset associated with the given domain within which the DSL simulant is executed. In other implementations, the execution of the DSL simulant helps determine strategies for remediating against the attack execution operation.

Enticing a Threat-Actor

FIG. 6 shows a flowchart 600 for generating a DSL file that creates a computing environment for enticing a threat-actor to execute one or more attack execution operation. At block 606, the adversary enticing unit 239 may be executed by one or more computing device processors to determine a second primitive based on the framework of flowchart 400. The second primitive may indicate enticement information associated with the one or more resources discussed above in association with the with the attack repository of FIG. 4. For example, enticement information may be information associated with resources (i.e., input resources) comprised in the one or more resources of the attack repository. These resources may further include a resource selected from the resource group comprising: file (e.g., input file), a file path, a URL, database information, financial data, social media data, personal data (e.g., social security number, driver's license, tax data, etc.), organizational data, trade secrets, MAC addresses, geolocation data, etc. In one embodiment, the resource selected from the resource group is a bogus resource as previously discussed.

In some implementations, the second primitive comprises at least a first enticing step comprised in the enticement information configured to entice the first attacker. The first enticing step may comprise: a second identifier defining the first enticing step, an enticing command associated with the first enticing step, and one or more input resources comprised in the one or more resources. The enticing command may act on the one or more input resources. The one or more input resources may include an input file and/or a file path to the input file, etc. Additionally, the first enticing step may also include a platform on which the first enticing step is executed. In a preferred embodiment, the platform is an operating system on which the first enticing step is executed. In one implementation, the operating system is a Windows operating system. In another embodiment, the operating system is a Macintosh operating system. In further embodiments, the operating system is a Linux operating system.

At block 608, the adversary enticing unit 239 may be executed by the one or more computing device processors to combine the first primitive generated from flowchart 400 to the second primitive of flowchart 600 into a DSL file. The generated DSL file in this case can be executed to create a computing environment that entices the first attacker to execute the first attack execution operation. In one implementation, the generated DSL file for enticing an adversary may be "ingested" by a computer security system or otherwise executed by one or more computing device processors within a first domain responsive to certain security event detections within said domain. For instance, security infrastructure 140 may detect, via threat detection unit 234 that a threat-actor is trying to infiltrate or otherwise attack the first domain within which security infrastructure 140 is. Responsive to this initial infiltration detection by security infrastructure 140, adversary enticing unit 239 may execute the DSL for enticing the threat-actor to continue infiltrating or attacking the first domain without actually compromising any valuable assets associated with the first domain. Thus, the DSL file for enticing the threat-actor not only steers the threat-actor away from actual valuable assets but also, provides a means for real-time or pseudo-real-time monitoring of the threat-actor as attack execution operations are being performed on bogus assets. Assets as used may refer to a software and/or a hardware resource associated with a given domain.

Defending Against a Threat-Actor

Figure 7:
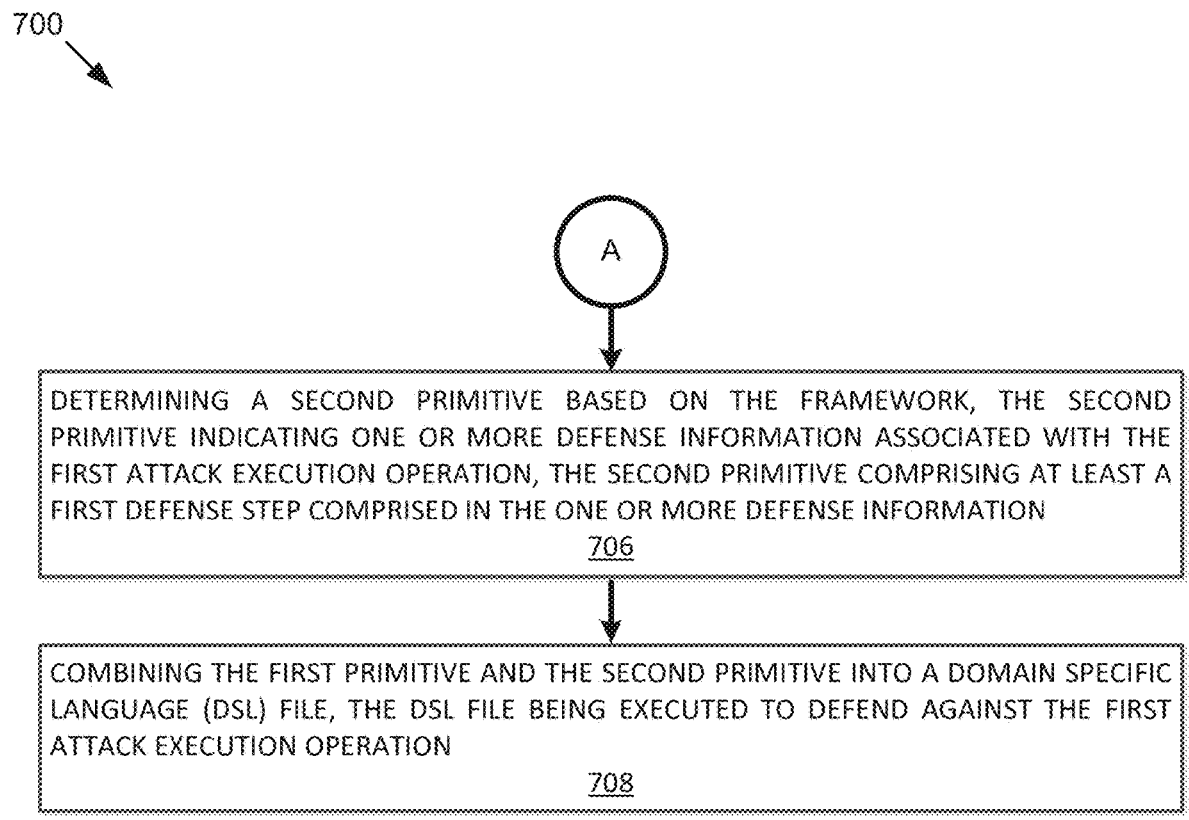
FIG. 7 is an example flowchart for generating a DSL file that implements defense operations against a first attack execution operation executed by the first attacker, according to one implementation of this disclosure.

FIG. 7 is a flowchart 700 for generating a DSL file that creates a computing environment for defending against an attack execution operation. At block 706, the defense operating unit 238 may be executed by the one or more computing device processors to determine a second primitive based on the framework. The second primitive in this case may indicate one or more defense information associated with the first attack execution operation of flowchart 400. In some implementations, defense information may be associated with tools such as software and/or hardware that enhance computer security operations. In other embodiments, defense information may be comprised within/associated with the one or more resources associated with the plurality of attack execution operations mentioned in association with flowchart 400. For instance, defense information may be associated with at least one resource selected from a group of resources comprising: access control software, anti-keyloggers, anti-malware, anti-spyware, anti-subversion software, anti-tamper software, antivirus software, cryptographic software, Firewall (web or otherwise), IDS, IPS, log management software, records management software, Sandboxes, security information management, SIEM software, anti-theft software, parental control software, cloud-based security protection, filesystem, event viewer, and a system monitor.

Turning back to flowchart 700, the second primitive may comprise at least a first defense step comprised in the one or more defense information. In some instances, the first defense step comprises: a second identifier defining the first defense step and a parameter indicating a security measure for defending against the first attack execution operation. At block 708, the adversary enticing module 266 may combine the first primitive and the second primitive into a DSL file that is executable to defend against the first attack execution operation. In one implementation, the generated DSL file for defending against the first attack execution operation, may be "ingested" by a computer security system or otherwise executed by one or more computing device processors within a first domain responsive to certain security event detections within said domain. For instance, security infrastructure 140 may detect, via threat detection unit 234 that a threat-actor is trying to infiltrate or otherwise attack the first domain within which security infrastructure 140 is. Responsive to this initial infiltration detection by security infrastructure 140, defense operation unit 238 may execute the DSL file for defending against the first attack execution operation in order to dynamically adapt the security posture of the first domain to mitigate against attack execution operations of the first attacker. In other embodiments, defense operation unit 238 can execute the DSL file for defending against the first attack execution operation based on the nature of the initial infiltration executed by the threat-actor, the type of security systems associated with the first domain, the type of threat-actor executing the first attack execution operation, a frequency with which the first attacker is executing attack execution operations on assets or resources associated with the first domain, etc. Thus, the DSL file for defending against a threat-actor can provide a "domain-specific" adaptation of systems associated with a given domain in order to defend in real-time using appropriate security tools and resources against one or more attack execution operations associated with a threat-actor.

Systems and methods for generating DSL files that: simulate a threat-actor executing an attack execution operation; defend against attack execution operations by a threat-actor; and entice a threat-actor to execute an attack execution operation are described above. In the preceding description, for purposes of explanation, numerous specific details are set forth in order to provide a thorough understanding of the disclosure. It will be apparent, however, that the disclosure can be practiced without these specific details. In other instances, structures and devices have been shown in block diagram form in order to avoid obscuring the disclosure. For example, the present disclosure has been described in some implementations above with reference to user interfaces and particular hardware but is not necessarily limited in implementation by said user interfaces and particular hardware.

Reference in the specification to "one implementation," "an implementation," "an embodiment," and "some embodiments" means that a particular feature, structure, or characteristic described in connection with the implementation or embodiment is included in at least one implementation or embodiment of the disclosure. The appearances of the phrases "one implementation," "an implementation," "an embodiment," and "some embodiments" in various places in the specification are not necessarily all referring to the same implementation.

Some portions of the detailed descriptions above are presented in terms of symbolic representations of operations on data bits within a computer memory. These symbolic representations are the means used by those skilled in the data processing arts to most effectively convey the substance of their work to others skilled in the art. These symbolic representations can take the form of electrical or magnetic signals capable of being stored, transferred, combined, compared, and otherwise manipulated. It has proven convenient at times, principally for reasons of common usage, to refer to these electrical or magnetic signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other information storage, transmission or display devices.

The present disclosure also relates to an apparatus for performing the operations herein. This apparatus may be specially constructed for the required purposes, or may include a general-purpose computer selectively activated or reconfigured by a computer program stored in the computer. Such a computer program may be stored in a computer readable storage medium, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In some implementations, the disclosure is implemented in software, which includes but is not limited to firmware, resident software, microcode, and other computer readable code.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

This application incorporates by reference the entirety of application Ser. No. 16/384,543, titled "Attack Kill Chain Generation and Utilization for Threat Analysis" filed on 2019 Apr. 15, and application Ser. No. 16/384,560, titled "Asset Remediation Trend Map Generation and Utilization for Threat Mitigation" filed on 2019 Apr. 15, and application Ser. No. 16/384,535, titled "Domain-Specific Language for Threat-Actor Deception" filed on 2019 Apr. 15, and application Ser. No. 16/384,339, titled "Domain Specific Language for Defending Against a Threat-Actor and Adversarial Tactics, Techniques, and Procedures" filed on 2019 Apr. 15.

What is claimed is:

1. A method comprising:
   determining, using one or more computing device processors, a framework based on an attack repository, the attack repository comprising attack data captured from multiple computing devices associated with different entities, the attack data comprising one or more of:
   a plurality of attack execution operations,
   one or more attackers associated with the plurality of attack execution operations, and
   one or more resources associated with the plurality of attack execution operations;
   determining, using one or more computing device processors, a first primitive based on the framework, the first primitive comprising:
   a first identifier defining a first attack execution operation comprised in the plurality of attack execution operations,
   a first descriptor indicating an attack type associated with the first attack execution operation,
   a second descriptor indicating a vulnerability type associated with the first attack execution operation,
   a third descriptor indicating a stability parameter associated with the first attack execution operation, and
   a fourth descriptor indicating intensity data associated with the first attack execution operation;
   determining, using one or more computing device processors, a second primitive based on the framework, the second primitive indicating one or more attack information associated with the first attack execution operation, the second primitive comprising at least a first attack step comprised in the one or more attack information, the first attack step comprising:
   a second identifier defining the first attack step,
   an attack command associated with the first attack step, and
   one or more input resources serving as input to the attack command, the one or more input resources including at least one resource comprised in the one or more resources associated with the plurality of attack execution operations for executing the first attack step, and
   a platform on which the first attack step is executed; and
   combining, using one or more computing device processors, the first primitive and the second primitive into a domain specific language (DSL) simulant, the DSL simulant being executed to simulate attack operations executed by a first attacker to determine strategies for remediating against the first attack execution operation.

2. The method of claim 1, wherein the DSL simulant is configured to be executed within a specific domain, such that a security system outside the specific domain cannot execute the DSL simulant.

3. The method of claim 1, wherein the attack type comprises one of a pre-attack type, a mobile attack type, and an enterprise attack type.

4. The method of claim 3, wherein:
   the pre-attack type indicates whether the first attack step is executed to:
   select a first target,
   obtain information about the first target, and
   execute the first attack execution operation on the first target;
   wherein:
   the mobile attack type indicates whether the first attack step is executed as part of the first attack execution operation on a second target, the second target comprising a mobile computing environment; and
   the enterprise attack type indicates whether the first attack step is executed as part of the first attack execution operation on a third target, the third target comprising an enterprise computing environment.

5. The method of claim 1, wherein the vulnerability type associated with the first attack execution operation is one of:
   a public vulnerability indicating that the first attack execution operation is associated with a publicly known attack execution operation;
   a private vulnerability indicating that the first attack execution operation is associated with a private attack execution operation; and
   a custom vulnerability indicating that the first attack execution operation is associated with a custom attack execution operation.

6. The method of claim 1, wherein the stability parameter associated with the first attack execution operation comprises one of:
   a low stability parameter indicating that the DSL simulant is substantially unstable when executed;
   a medium stability parameter indicating that the DSL simulant is actively monitored when executed; and
   a high stability parameter indicating that the DSL simulant is substantially stable when executed.

7. The method of claim 1, wherein the intensity data associated with the first attack execution operation is categorized based on a parameter associated with the intensity data.

8. The method of claim 1, wherein the one or more input resources comprise at least one or more of:
   an input file,
   an output file,
   a file path to the input file, and
   a file path to the output file.

9. The method of claim 1, wherein the platform is an operating system on which the first attack execution step is executed.

10. The method of claim 1, wherein the framework maps security events detected on one or more computing devices to one or more security operations.

11. A computer program product comprising a non-transitory computer useable medium including a computer readable code, wherein the computer readable code when executed using one or more computing device processors, causes the one or more computing device processors to:
    determine a framework based on an attack repository, the attack repository comprising attack data captured from multiple computing devices associated with different entities, the attack data comprising one or more of:
    a plurality of attack execution operations,
    one or more attackers associated with the plurality of attack execution operations, and
    one or more resources associated with the plurality of attack execution operations;
    determine a first primitive based on the framework, the first primitive comprising:
    a first identifier defining a first attack execution operation comprised in the plurality of attack execution operations, a first descriptor indicating an attack type associated with the first attack execution operation, a second descriptor indicating a vulnerability type associated with the first attack execution operation, a third descriptor indicating a stability parameter associated with the first attack execution operation, and a fourth descriptor indicating intensity data associated with the first attack execution operation;

determine a second primitive based on the framework, the second primitive indicating one or more attack information associated with the first attack execution operation, the second primitive comprising at least a first attack step comprised in the one or more attack information, the first attack step comprising:

a second identifier defining the first attack step, an attack command associated with the first attack step, and one or more input resources serving as input to the attack command, the one or more input resources including at least one resource comprised in the one or more resources associated with the plurality of attack execution operations for executing the first attack step, and a platform on which the first attack step is executed; and combine the first primitive and the second primitive into a domain specific language (DSL) simulant that simulates attack operations executed by a first attacker, the DSL simulant being configured to be executed within a specific domain, such that a security system outside the specific domain cannot execute the DSL simulant.

12. The computer program product of claim 11, wherein the one or more input resources comprise at least one or more of:

an input file, an output file, a file path to the input file, and a file path to the output file.

13. The computer program product of claim 11, wherein the platform is an operating system on which the first attack execution step is executed.

14. The computer program product of claim 11, wherein the framework maps security events detected on one or more computing devices to one or more security operations.

15. A system comprising:

one or more computing system processors; and memory storing instructions that, when executed by the one or more computing system processors, causes the system to:

determine a framework based on an attack repository, the attack repository comprising attack data captured from multiple computing devices associated with different entities, the attack data comprising one or more of:

a plurality of attack execution operations, one or more attackers associated with the plurality of attack execution operations, and one or more resources associated with the plurality of attack execution operations;

determine a first primitive based on the framework, the first primitive comprising:

a first identifier defining a first attack execution operation comprised in the plurality of attack execution operations, a first descriptor indicating an attack type associated with the first attack execution operation, a second descriptor indicating a vulnerability type associated with the first attack execution operation, a third descriptor indicating a stability parameter associated with the first attack execution operation, and a fourth descriptor indicating intensity data associated with the first attack execution operation;

determine a second primitive based on the framework, the second primitive indicating one or more attack information associated with the first attack execution operation, the second primitive comprising at least a first attack step comprised in the one or more attack information, the first attack step comprising:

a second identifier defining the first attack step, an attack command associated with the first attack step, or one or more input resources serving as input to the attack command, the one or more input resources including at least one resource comprised in the one or more resources associated with the plurality of attack execution operations for executing the first attack step, and a platform on which the first attack step is executed; and combine the first primitive and the second primitive into a simulant that simulates attack operations executed by a first attacker, the simulant being configured to be executed within a specific domain, such that a security system outside the specific domain cannot execute the simulant.

16. The system of claim 15, wherein the one or more input resources comprise at least one or more of:

an input file, an output file, a file path to the input file, and a file path to the output file.

17. The system of claim 15, wherein the platform is an operating system on which the first attack execution step is executed.

18. The system of claim 15, wherein the framework maps security events detected on one or more computing devices to one or more security operations.

19. The system of claim 15, wherein the one or more resources associated with the plurality of attack execution operations further comprise one or more of malware, spyware, keyloggers, viruses, subversion software, and tamper software.

20. The system of claim 19, wherein at least one of the malware, spyware, keyloggers, viruses, subversion software, and tamper software is modeled into the second primitive.

* * * * *